United States Patent [19]

Breuer et al.

[11] Patent Number: 4,916,565
[45] Date of Patent: Apr. 10, 1990

[54] MAGNETIC TAPE CASSETTE HAVING IMPROVED CLOSURE MEANS

[75] Inventors: Rudolf Breuer, Munich; Hubert Brunner, Weil; August Liepold, Munich; Albert Pertzsch, Munich; Ludwig Zeroni, Munich, all of Fed. Rep. of Germany

[73] Assignee: AGFA-Gevaert Aktiengesellschaft, Leverkussen, Fed. Rep. of Germany

[21] Appl. No.: 133,526

[22] Filed: Dec. 16, 1987

[30] Foreign Application Priority Data

Dec. 19, 1986 [DE] Fed. Rep. of Germany ....... 3643457

[51] Int. Cl.$^4$ ............................................. G11B 23/087
[52] U.S. Cl. .................................................... 360/132
[58] Field of Search .......................... 360/132; 242/198

[56] References Cited

FOREIGN PATENT DOCUMENTS 57-147174 9/1982 Japan ..................................... 360/132

Primary Examiner—Robert S. Tupper
Attorney, Agent, or Firm—Connolly and Hutz

[57] ABSTRACT

A magnetic tape cassette, in which the activation of the front flap (11) and of the slide (15) is coupled by cassette-side means, contains a side part (12) of the front flap provided with a recess (20) in which a guide peg (18), which rests in the sidewall (16) of the slide, engages with the recess and thus couples the swivelling movement of the front flap with the sliding movement of the slide. In another embodiment, the side wall (12) of the front flap (11) contains a guide peg (22) which engages with a recess (21) provided in a side wall (16") of the slide (15) (FIG. 3, FIG. 5).

7 Claims, 4 Drawing Sheets

MAGNETIC TAPE CASSETTE HAVING IMPROVED CLOSURE MEANS

FIELD OF THE INVENTION

The Invention relates to a magnetic tape cassette, in particular a magnetic tape cassette with locking elements for the magnetic tape, by which the opening formed in the front side of the cassette and the cutout regions of the spool shaft introduction opening formed in the underside of the cassette are effectively locked.

BACKGROUND OF THE INVENTION

Cassettes of this kind are known for example from U.S. Pat. No. 4,572,461, GB Nos. 2,155,905, GB 2,167,386, EP No. 0 160 822 and GB No. 2 165 819. A magnetic tape cassette of that kind is represented in perspective in FIG. 1. The cassette consists of an upper casing half (1), comprising a back wall (2), side walls (3) running in parallel and a right-angled cover plate. A window opening (4) is provided in the middle of the cover plate, running in a longitudinal direction. This enables the state of winding of the magnetic tape to be observed. A lower casing half (5) contains in the middle part of its lower base plate two symmetrically placed openings (14), into which the drive shafts of the recorder for the spools (6a, 6b) are placed. The side walls and back walls of the upper and lower casing halves are essentially equal in height. If the upper and lower casing halves are mounted on one another, a casing space is formed in between. The spools (6a, 6b) serving to wind and unwind the magnetic tape (7) are symmetrically arranged in the middle region of this casing space. Toothing is provided at the upper or lower end regions of the hubs. Slide foils (8a, 8b) are arranged on both sides of the spools, so that easy sliding of the magnetic tape is guaranteed. A spool brake (9) locks the toothing of the hubs. The open space (10) formed between the upper and lower halves of the casing after assembly is sealed by a front flap (11), in order to prevent dust from penetrating into the cassette casing. Undrawn drive elements of a tape drive device reach into the open space. The front flap consists of a longitudinal front surface with a section slightly bent upwards and side (12) arranged at both ends. The front flap is swivellably mounted on the cassette casing by mounting pins (13) projecting from the inner surfaces of the side. A slide (15) is provided for covering the open space of the lower half of the casing, in order to prevent the penetration of dust through the opening (14). The slide comprises side walls (16) of equal height that run in parallel and a rectangular plate for connecting both side walls. Symmetrically placed openings (17) are provided in the middle region of the slide, through which the recorder-side drive shaft can reach to the spool hubs if the slide is in the rear position when the magnetic tape cassette is in open position. The slide is pre-stressed by a (not drawn) spring, whose bent-away end is fixed in the post (23) at the lower half of the casing and whose free end rests at the projection (19) on the slide. Another embodiment, which is described in GB No. 2 155 905 that has already been mentioned, provides a screw spring, for prestressing the slide, whose front part is supported by a projection in the cassette part and whose rear part is supported by a projection of the slide, and which is guided in a slit provided in the lower half of the casing.

In a magnetic tape cassette of this kind, the front part of the cassette casing is closed by the front flap (11) when not in use, which can be seen from FIG. 2, and the sliding slide is slid forward in such a manner that the cut-out region of the spool shaft inlet openings (14) is sealed by the slide, which moves in the direction of the arrow. The magnetic tape is thereby completely protected in the cassette casing.

However, the above construction also results in that during use of the cassette both the front flap and the slide must be activated, which occurs by relevant recorder-side means.

EP NO. 0 150 987 set as its object the coupling of activation of the front flap and of the slide of the magnetic tape cassette, which is effected by two toothed racks applied to be both sides of the slide, with which the toothed wheel segments connected with the front flap mesh. Such a magnetic tape cassette is, however, difficult to produce and to assemble, as the arrangement of toothed rack and toothed wheel segment presents problems during joining.

SUMMARY OF THE INVENTION

The object of this invention is therefore to create a magnetic tape cassette of the kind mentioned at the outset, in which the activation of the front flap and of the slide is coupled by the cassette, which remains simple to produce and to assemble and which comprises a low construction height both in its closed and in its open state.

The problem was solved according to the present invention by a magnetic tape cassette with the special features given in the characterising parts of the claims. More precise details are given in the description and the drawings.

BRIEF DESCRIPTION OF THE DRAWING

The invention will now be more closely described by means of the drawings, in which FIG. 1 gives an exploded representation of a conventional magnetic tape cassette FIG. 2 gives a perspective representation of a conventional magnetic tape cassette in its closed state FIGS. 3-5 give the side view of several embodiments of the cassette according to the invention, each in their open state FIGS. 6-8 give the side views corresponding to FIGS. 3-5 each in the closed state of the cassette.

DESCRIPTION OF THE PREFERRED EMBODIMENTS

Figure 1:
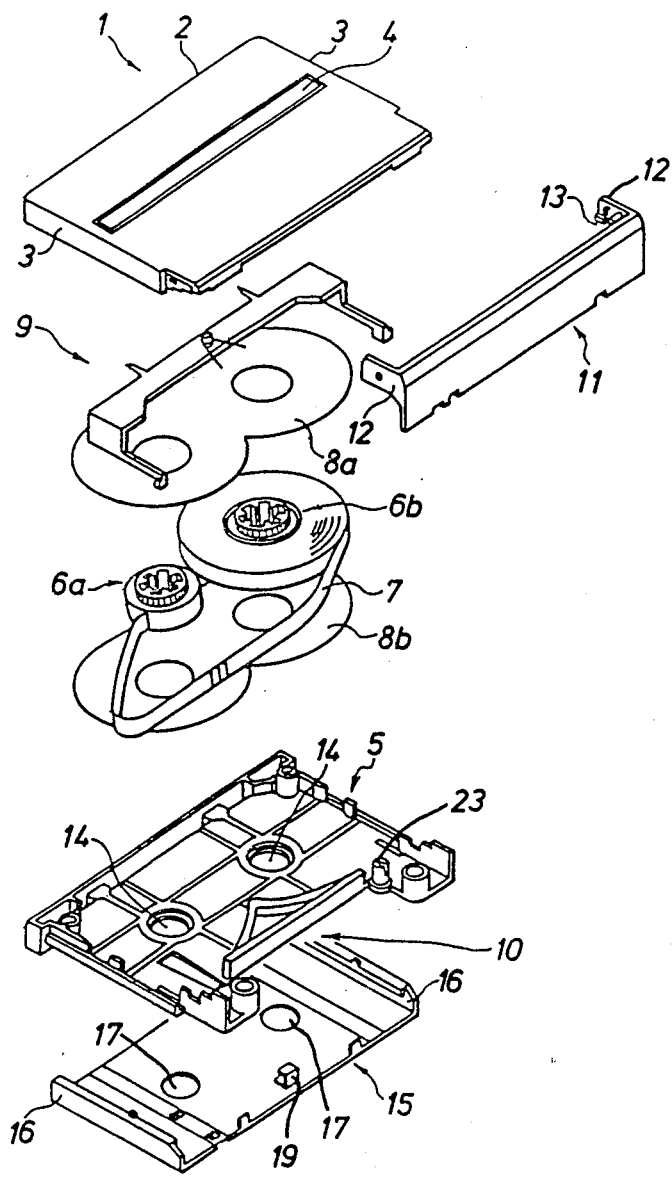
Figure 2:
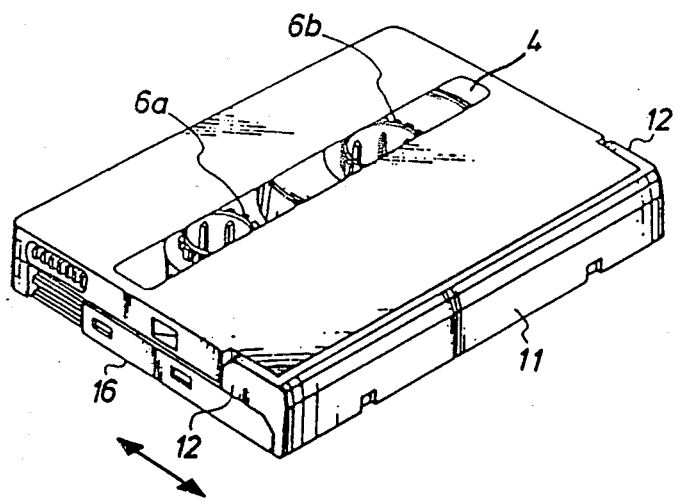
Figure 3:
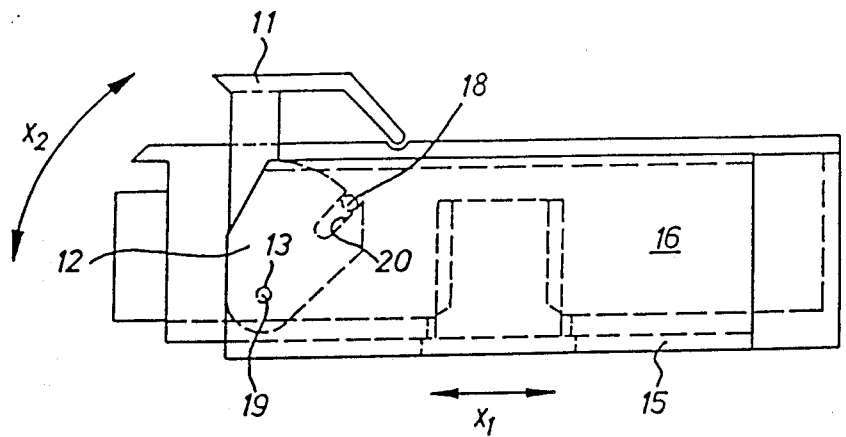

FIG. 3 represents the side views of an embodiment of the arrangement according to the invention in the open state of the magnetic tape cassette. The side wall (16) of the slide (15) contains preferably in its upper part a guide peg (18) pointing inwards. The side (12) of the front flap (11) arranged further inside, in parallel with the side wall (16) which is rotatably mounted around the point of rotation (19) by means of the pegs (13), as already described, has a recess (20) at its end pointing towards the bentaway part of the front flap, with which the guide peg (18) meshes. The recess (20) can be formed as a through-going slit or as a groove.

Figure 6:
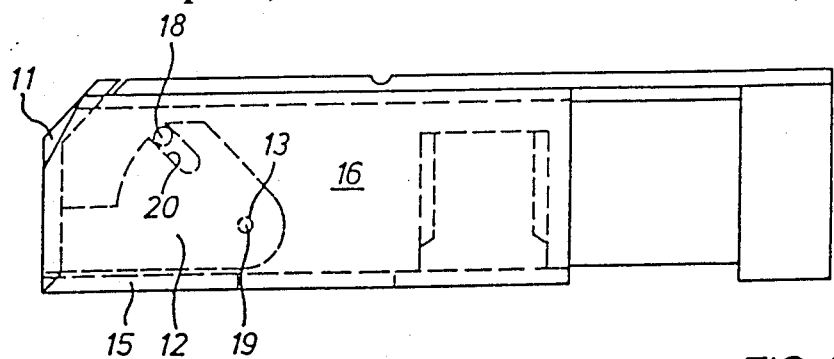

The length and position of the recess is calculated so that the guide peg is guided by it in the total swivelling range X2, eg 90°, of the front flap. In this manner an easy-to-produce coupling of the sliding movement of the slide in the direction of arrow X1 and of the swivelling movement of the front flap X2 is created. FIG. 6 shows the corresponding side view of the same magnetic tape cassette in its closed state.

Figure 4:
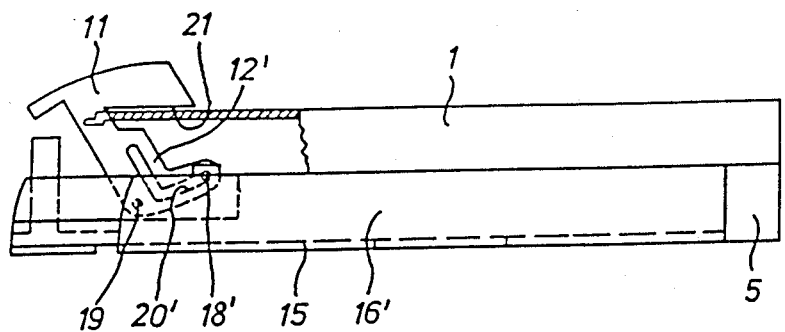
Figure 7:
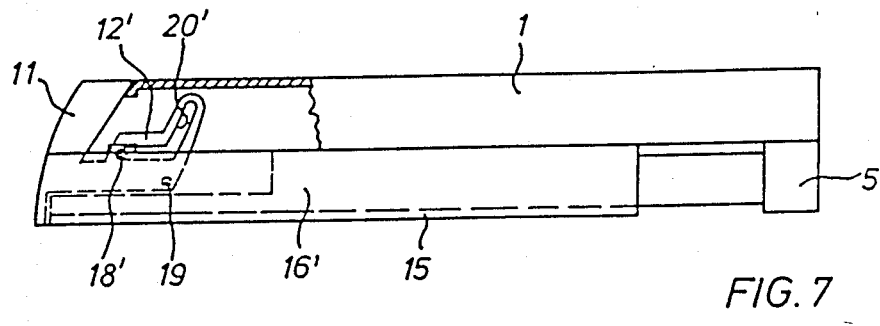

In FIG. 4 and FIG. 7, in which again a side view of the magnetic tape cassette in its open or closed state is to be seen, a variant embodiment of the invention is represented. There, the side wall of the front flap is developed as an angle-forming bracket (12') which is provided with a similarly angled slit (20'). The slit runs horizontally in its front part directed towards the front flap in the closed cassette state, that is, parallel to the line of connection of upper and lower cassette halves. The rear part runs bent up at a slant, roughly parallel to the upper bent part of the front flap, yet with a bend whose track is preferably opposite to that of this part. In this embodiment it is preferable, as will be seen from FIG. 4, that the front flap is not opened through an angle of 90° but simply through an angle of around 60°, where the rear side (21) of the upper front flap part serves as a stop on the upper side of the upper casing half. The advantage of this construction is that the construction height of the slide (15) can be kept low, so that it simply reaches the height of the lower cassette half (5) with the exception of the region of the peg (18') controlling the front flap. A further advantage consists in the fact that the unit slidelower cassette half-front flap can be pre-assembled in a simple manner and the upper cassette half can then be added to this unit.

Figure 5:
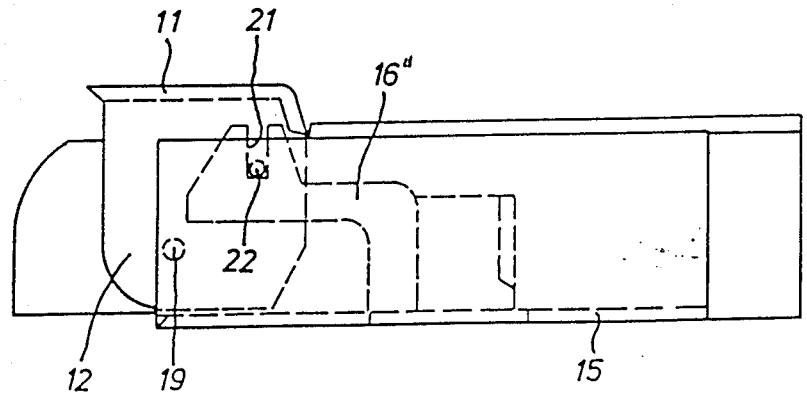
Figure 8:
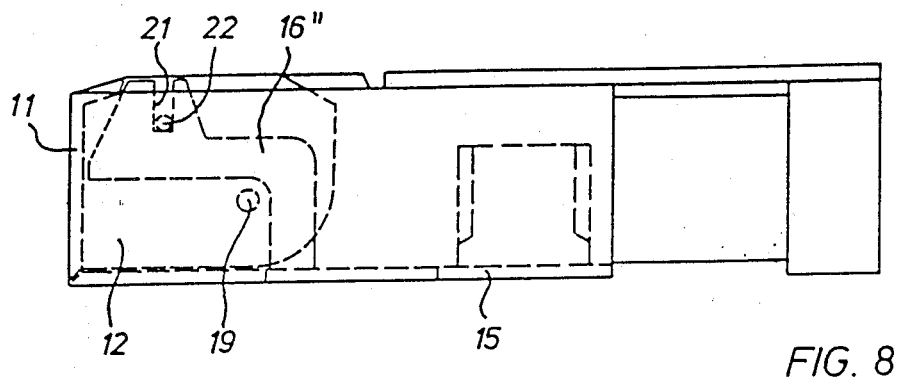

A further solution according to the invention of the problem posed is given in FIGS. 5 and 8. Here the side wall of the slide consists essentially of a bracket (16') with possibly several angles, at whose upper end the recess (21) is located, preferably pointing vertically upwards. The style of recess (21) is identical to the style of recess (20). The side part (12) of the front flap (11) preferably has in its upper part a guide peg (22) pointing outwards, which meshes with the recess (21) of the bracket (16') lying outside and in this manner provides the coupling between front flap and slide. In this solution too the position and dimensions of the recess are of course calculated so that the guide peg participating in the swivelling movement of the front flap takes up every position in the recess (21).

The characteristics according to the invention described in the foregoing, such as brackets, recesses and guide pegs, can be present only in one side part of the cassette, yet in a preferred embodiment could be present in both side parts.

In all embodiments of the cassette according to the invention the turning point (19) of the front flap is preferably located below the geometric middle, in an especially preferred embodiment in the lower third of the cassette side part. Common to all embodiments is a low construction height of the cassette even in its open state, to which end it also helps that the upper angleforming part of the front flap rests in a cleft (FIG. 3) or an edge (FIG. 5) of the upper cassette half.

The first two wall embodiments described above are distinct from the third construction in that with them the side of the slide carries the guide peg pointing inwards and the side wall of the front flap has a recess, while in the third embodiment the side wall of the front flap is provided with the guide peg pointing outwards, which engages in a recess of the side wall or of the side bracket of the slides. The sequence of sides (from the cassette inside outwards) is in all embodiments preferably: cassette side wall side wall front flap side bracket slide. Yet, if constructional reasons demand it, a different sequence of sides or another form of recess of the brackets or of the front flap is thinkable, without thereby leaving the spirit of the invention.

We claim:

1. A magnetic tape cassette comprising
   a two-part housing having an upper casing and a lower casing fixed together defining an opening, with the upper casing having cassette side walls and an upper surface,
   a slide member in the cassette having side walls which side walls are parallel to the cassette side walls and are moveably engaged to the outside of the lower casing such that the slide member is slidable inwardly and outwardly in a direction parallel to the cassette side walls and toward and away from the opening,
   at least one point of rotation peg mounted onto the exterior surface of the cassette side wall,
   a closure member having a front flap with an upper end and at least one side wall with said closure member side wall positioned between the cassette side wall and the slide side wall and with the closure member side wall receiving the rotation peg and rotatable thereon so that the closure member is swivellably mounted in the cassette to move the front flap and open and close the opening,
   a part of the slide side wall being adjacent to the closure member side wall,
   at least one guide peg mounted onto the part of the slide side wall adjacent to the closure member side wall at any point not in that line with the rotation peg in the direction of movement in the slide member,
   an elongated recess formed in the closure member side wall, the recess being engageable with the guide peg and oriented with its open end being directed away from the rotation peg so that the inward and outward sliding movement of the slide member swivels the closure member.

2. A magnetic tape cassette as recited in claim 1, wherein the elongated recess of the closing means side wall is oriented such that its open end is directed away from the rotation peg and toward the front flap.

3. A magnetic tape cassette as recited in claim 1, wherein said elongated recess extends in two directions and defines an angular slit having a first leg directed toward the front flap of closure member and substantially parallel to the slide member side walls when the closure member is in the closed position and having a second leg extending from the first leg at a substantial angle and directed toward the upper casing when the closure member is in the closed position.

4. A magnetic tape cassette as recited in claim 3 wherein the angular slit is an angular groove.

5. A magnetic tape cassette comprising
   a two-part housing having an upper casing and a lower casing fixed together defining an opening, with the upper casing having cassette side walls, and an upper surface,
   a slide member in the cassette having side walls which side walls are parallel to the cassette side walls and are moveably engaged to the outside of the lower casing such that the slide member is slidable inwardly and outwardly in a direction parallel to the cassette side walls, and toward and away from the opening, an angular bracket formed in the interior of at least one of the slide member side walls, at least one point of rotation peg mounted onto the exterior surface of the cassette side wall, a closure member having a front flap with an upper end and at least one side wall, with said closure member side wall positioned between the cassette side wall and the slide side wall and with the closure member side wall receiving the rotation peg and rotatable thereon so that the closure member is swivellably mounted in the cassette to move the front flap and open and close the opening, a part of the closure member side wall being adjacent to the angular bracket of the slide member side wall, at least one guide peg mounted onto that part of the closure member side wall, an elongated recess formed in the bracket, the recess being engageable with the guide peg and oriented with its open end being directed substantially away from the rotation peg so that the inward and outward sliding movement of the slide member swivels the closure member.

6. A magnetic tape cassette as recited in claims 1, 2, 3, 4 or 5 wherein the rotation peg is mounted onto the exterior surface of the cassette side wall at a point located below the horizontal center line of the cassette side wall 7. A magnetic tape cassette as recited in claims 1, 2, 3, 4 or 5 wherein the upper part of the front flap of the closure member rests in close relation on the exterior upper surface of the upper casing when the closure member is in the fully open state.

* * * * *